June 3, 1958 K. RODENHUIS 2,837,681
ELECTRIC DISCHARGE TUBE
Filed July 23, 1953

INVENTOR
KLAAS RODENHUIS
BY
AGENT

United States Patent Office 2,837,681
Patented June 3, 1958

2,837,681

ELECTRIC DISCHARGE TUBE

Klaas Rodenhuis, Eindhoven, Netherlands, assignor, by mesne assignments, to North American Philips Company, Inc., New York, N. Y., a corporation of Delaware Application July 23, 1953, Serial No. 369,803

Claims priority, application Netherlands July 30, 1952

2 Claims. (Cl. 313—258)

This invention relates to electric discharge tubes and, more particularly, to means for centering the electrode system of the tube relative to the envelope.

Electric discharge tubes which employ a centering member, usually a mica disc, having resilient projections which bear against the tube envelope suffer from the drawback that they are unable to withstand shocks resulting from considerable forces of acceleration, for example, 500 to 1000 g, where g represents the force of gravity, since the projections soon splinter. Furthermore, since the centering member is not firmly clamped within the envelope, the tube is unable to withstand vibrations which involve comparatively low forces of acceleration (about 5 g) because these vibrations cause clearance between the electrode supports and the centering members when the electrodes are subject to motion, which consequently results in the parts of the centering member which rest against the tube wall splintering.

The principal object of the invention is to obviate the foregoing difficulties by providing a centering member within a tube envelope which will not splinter when the tube is subjected to shock and vibrations.

According to the invention, the centering member for centering and supporting an electrode system within an envelope comprises a planar member, for example, of mica, the periphery of which has the shape of a plurality of intersecting arcs which subtend obtuse angles at their points of intersection, the largest transverse dimension of the centering member exceeding by at least 0.5% the inner diameter of the envelope, whereby the centering member is clamped within the envelope.

In a preferred embodiment according to the invention, the circumference of a mica centering member is formed by four arcs whose radii exceed the radius of the inner wall of the envelope portion which is engaged by the mica member, the arcs forming four points subtending an obtuse angle. For optimum results the four arcs should be equal and have radii between 20% and 30% larger than the radius of the interior of the envelope portion wherein the centering member is clamped. In this case, the largest transverse dimension of the mica member occurs across the diametrically-opposed points of intersection of the arcs, which dimension should exceed the inner diameter of the envelope by between 0.5 and 2%. With this arrangement, it has been found that the centering members do not splinter even when exposed to the most severe and violent shocks and/or continued vibration.

The inner diameter of the envelope must be maintained within relatively small tolerances in order that the centering member is properly clamped in position. For this purpose, the so-called calibration bulbs may be utilized, in which the tolerances may be maintained below 1/3%, and preferably about 1/4%. The tolerance of the mica members should be about 0.05 mm.

The invention will now be described with reference to the accompanying drawing in which.

Figure 1:
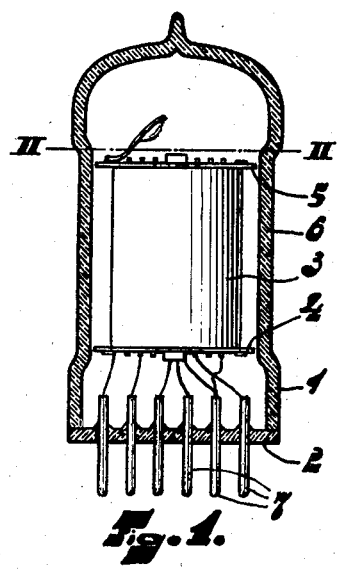
Fig. 1 shows one form of discharge tube according to the invention.
Figure 2:
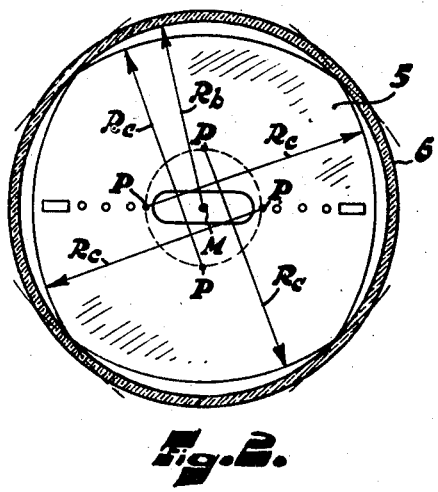
Fig. 2 is a cross-sectional view of the tube shown in Fig. 1 along the line II—II.

Referring to Fig. 1, one form of discharge tube of the invention comprises an envelope or bulb 1, for example, of glass or metal, which is closed by a bottom part 2 into which contact pins 7 are sealed. Mounted on the pins 7 is an electrode system 3 which is centered and clamped in an intermediate, reentrant, cylindrical part 6 of the bulb 1 by means of a pair of mica centering members 4 and 5. The part 6 has a very accurately calibrated inner diameter. As one example, the inner diameter of the part 6 is 18.2 mm., hence the radius $R_b$ (Fig. 2) of the part is 9.1 mm. The mica members 4 and 5 have a periphery bounded by four arcs whose radius $R_c$ exceeds $R_b$, and for the illustrative example amounts to 11.5 mm., i. e., approximately 26% more than $R_b$. In this case, the centers P of the arcs $R_c$ are spaced 2.9 mm. from the center M of the bulb. Alternatively, the radius $R_c$ of two arcs located opposite each other may be varied to obtain an elongated centering member. However, the construction shown in Fig. 2 yields the optimum positioning with a view to withstanding shocks and vibrations. Prior to introducing the centering member into the bulb, provision is made that the distances of diametrically-opposed intersections of the arcs $R_c$ exceed the inner diameter of the bulb by about 0.5 to 2%. This results in the required firm clamping between the centering member and the bulb while the centering member can be introduced into the bulb without damage. As a further alternative, the centering member may be slightly rounded at the intersections of the arcs.

While I have described my invention in connection with specific embodiments and applications, other modifications thereof will be readily apparent to those skilled in this art without departing from the spirit and scope of the invention as defined in the appended claims.

What is claimed is:

1. An electron discharge tube comprising a substantially cylindrical envelope; a reentrant cylindrical section in the cylindrical wall of said envelope intermediate the ends thereof, said reentrant section having a precisely determined inner diameter; an electrode system within said envelope supported at one end by electrode-connecting pins extending through an end wall of said envelope; a planar mica locating disc secured to the other end of said electrode system, the perimeter of said disc being defined by a plurality of arcs intersecting in a plurality of obtuse points, the radius of each of said arcs exceeding by 20% to 30% the inner radius of said reentrant section and the geometrical center of said disc being located substantially directly in line between the central point on each of said arcs and the center of curvature thereof, said obtuse points forming regions of maximum diameter of said mica locating disc, said maximum diameter being at least 0.5% greater than the precisely determined inner diameter of said reentrant section but not more than 2% greater than said inner diameter; said mica disc being transversely anchored within said reentrant section with said points exerting lateral pressure against said reentrant section to prevent said electrode system from moving laterally within said envelope.

2. An electron discharge tube as set forth in claim 1 wherein the perimeter of said disc is formed by four substantially equal arcs, and the radius of each of said arcs exceeds by 26% the inner radius of said reentrant section.

References Cited in the file of this patent

UNITED STATES PATENTS 2,219,111  Nicoll _____ Oct. 22, 1940
2,666,866  Prager _____ Jan. 19, 1954